Oct. 30, 1962   J. A. ENZENBACHER   3,060,534
CORE SETTING METHOD AND APPARATUS
Filed Jan. 6, 1960   4 Sheets-Sheet 1
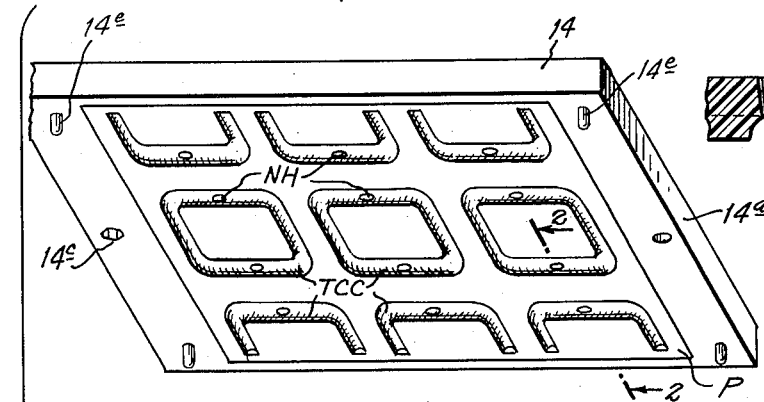
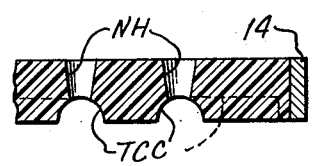
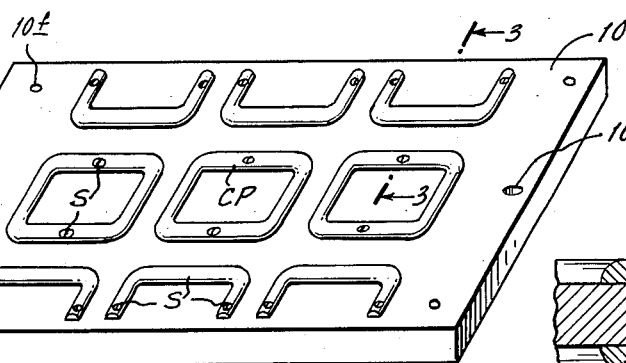
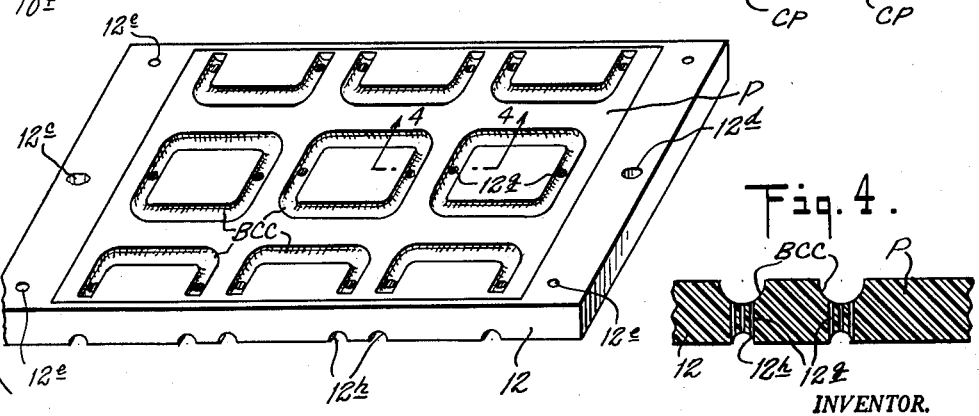
INVENTOR.
JEAN A. ENZENBACHER
BY
ATTORNEYS

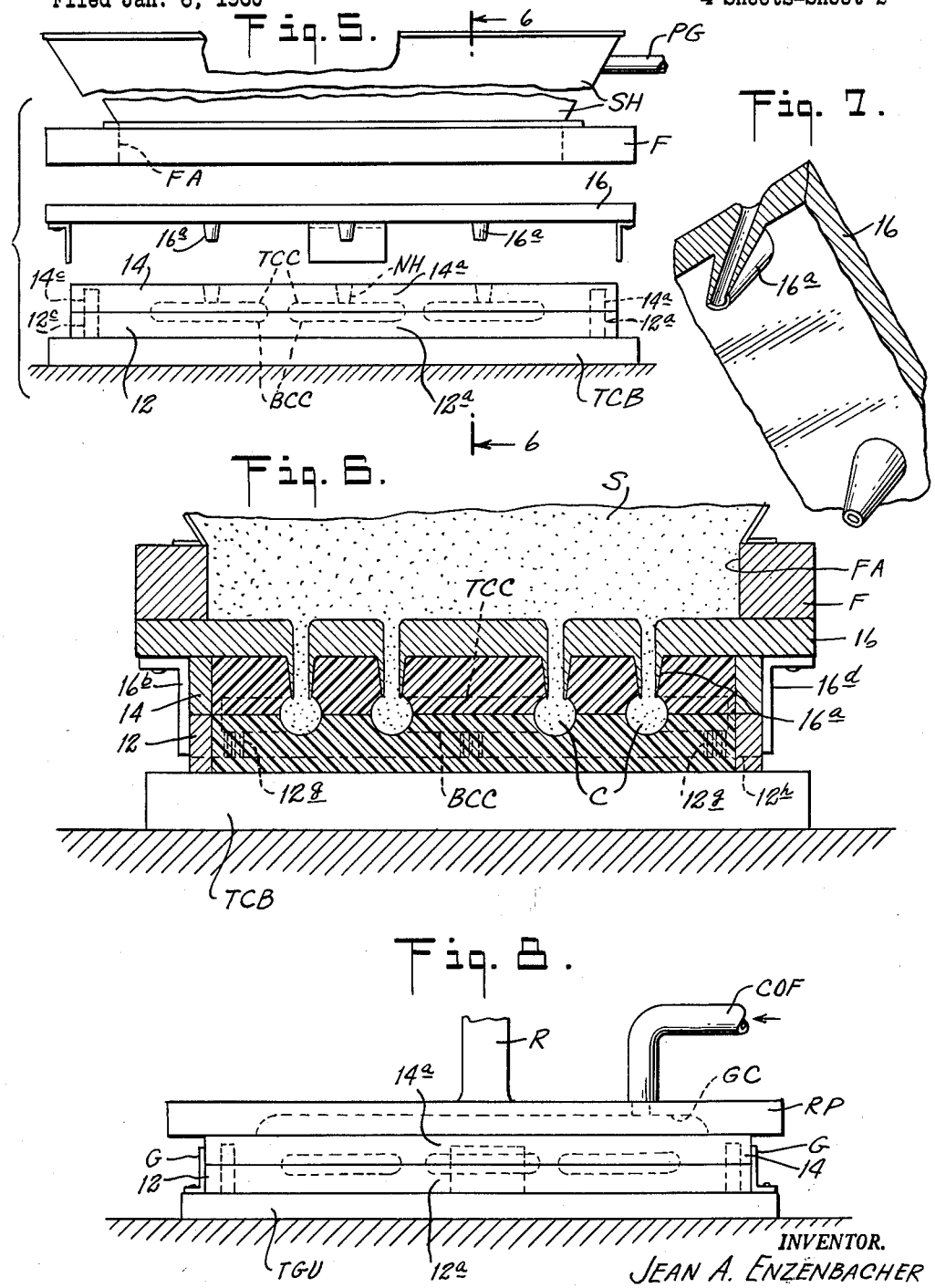

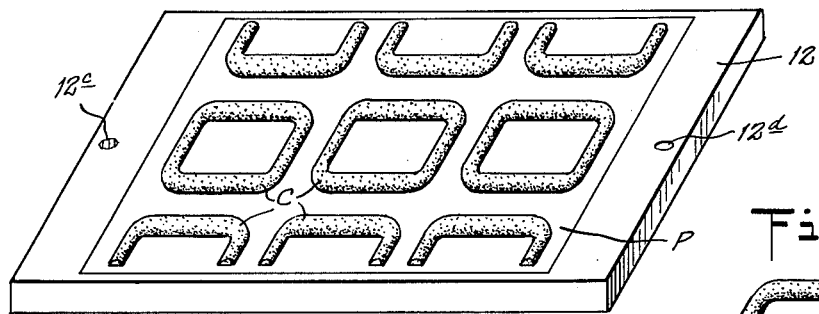
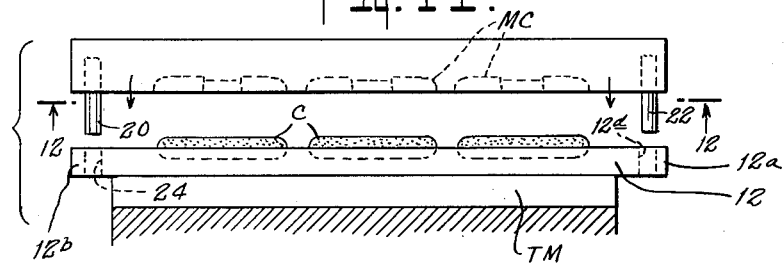
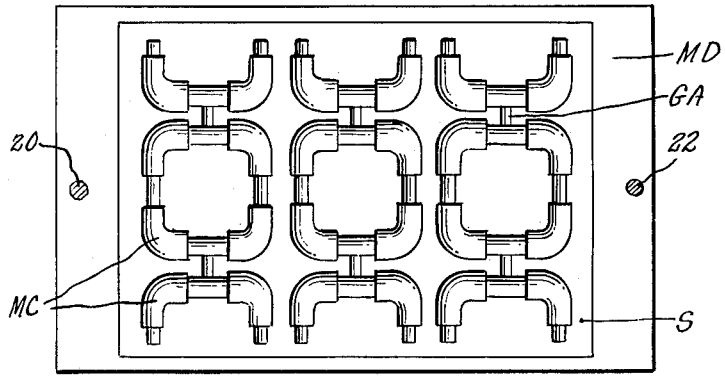

Oct. 30, 1962  J. A. ENZENBACHER  3,060,534
CORE SETTING METHOD AND APPARATUS
Filed Jan. 6, 1960  4 Sheets—Sheet 4
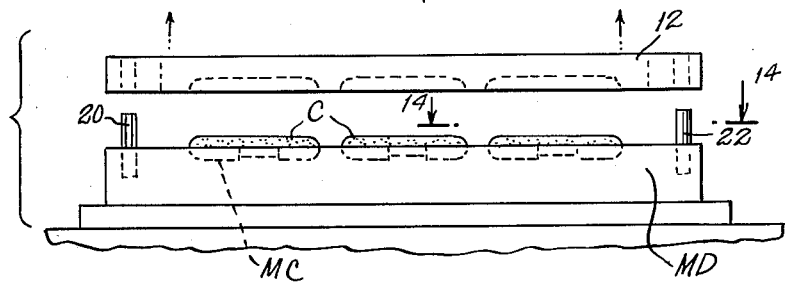
Fig. 13.
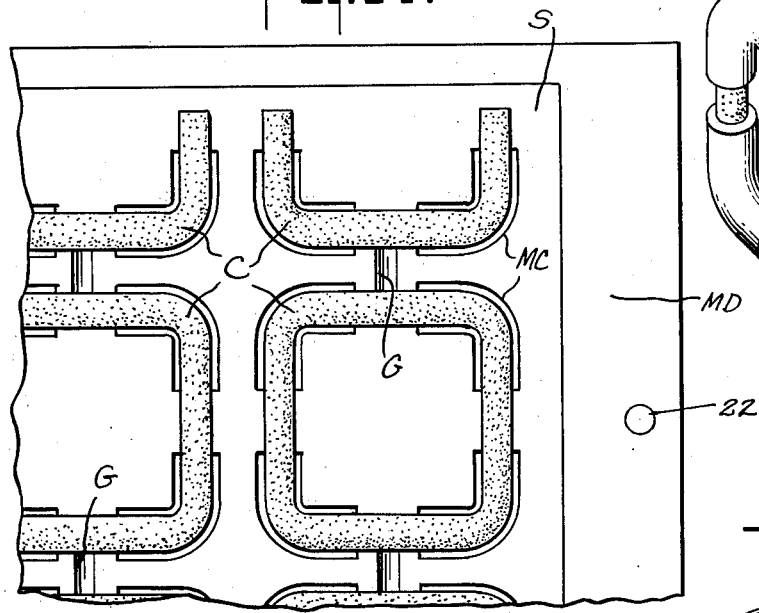
Fig. 14.
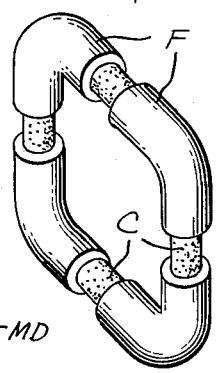
Fig. 16.
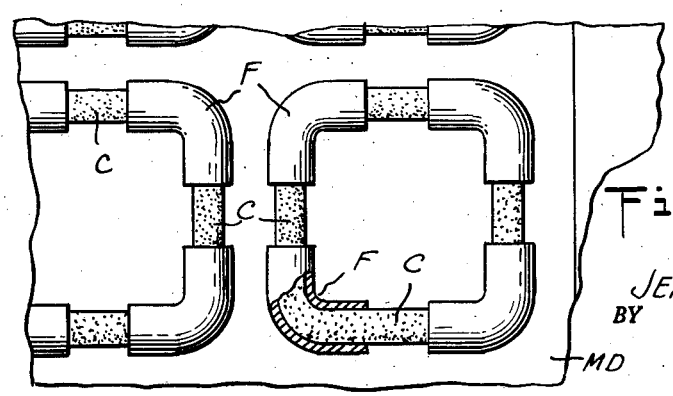
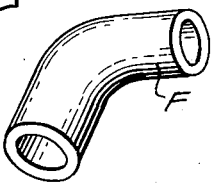
Fig. 17.
Fig. 15.
INVENTOR.
JEAN A. ENZENBACHER
BY
Darby & Darby
ATTORNEYS

United States Patent Office 3,060,534
Patented Oct. 30, 1962

3,060,534
CORE SETTING METHOD AND APPARATUS
Jean A. Enzenbacher, 980 Longmeadow St.,
Longmeadow, Mass.
Filed Jan. 6, 1960, Ser. No. 783
1 Claim. (Cl. 22—192)

This invention relates to a method and the apparatus for coordinating the making of a plurality of foundry mold cores with the making of the molds and accurate placement of a plurality of cores simultaneously in the mold cavities.

Recent years have seen many improvements in foundries to increase mold production. To keep pace with improved molding machines, mechanized systems for the proper control and treatment of sand, for its conveyance to the molding machines, for the conveyance of the finished molds away from the molding machines, for pouring the molds, for separating the castings from the flasks and sand, for the return of flasks to the molding machines, etc., have been developed. These various operations have been tied into synchronized units, but one operation remains which is entirely separate and distinct in itself, i.e. the making of the cores.

Coremaking is still done in its own department, proceeding at its own pace, and not tied in with the other foundry operations. After the cores are made, much handling ensues. They are cured, stored, transported to the molding room when needed, and placed into the mold cavities by hand. Since cores are fragile, so much handling causes considerable breakage and since it is difficult to ascertain the number required, cores are often left over. Extras must then be destroyed or transported back to the storage area where they will occupy valuable space and have a further chance of breaking. In addition, as they age, weather conditions often deteriorate them.

Further, skilled, experienced labor is needed to position the cores accurately in the mold cavities without disturbing the mold walls. At best, it is a very tedious process which does not lend itself to speed, and the whole improved process of molding is slowed down by the long used and little improved procedure of individually placing the cores in the mold cavities.

An object of this invention is to coordinate core-making with mold making; completely to eliminate the need for core handling, transportation, storage and the space required therefor; to eliminate core waste in the form of breakage; left over cores, and deteriorated cores; to eliminate the need for a coreroom; to simplify the scheduling of jobs in the foundry by removing the necessity for scheduling core-making ahead of mold making; to eliminate the individual placing by hand of each core in its mold cavity; to eliminate at any stage of the procedure hands touching the cores; to make possible the immediate transfer of the cores regardless of the number, from the core box to the mold cavities; to eliminate the need for a core setter, skilled or unskilled, and at the same time to increase output per mold making machine by having the core maker not only make and cure the cores but transfer them to the mold and assist in the molding operation itself; in cases where automatic molding machines are used to realize the full potential of the machine; to reduce greatly labor and material costs and floor space needed in the many ways that are obvious from the following description.

Other objects are to make possible greater accuracy in the positioning of the cores in the mold cavities than can be achieved by hand, thereby to make castings with more uniform wall thickness and more centrally located cored holes; to disturb the mold cavities less than can be done by hand setting of the cores, thereby to remove an important cause of dirt in the casting.

A very important object of this invention is to provide novel methods and apparatus by means of which a plurality of cores for cored castings, and particularly small castings, may be made and positioned in the mold cavities in a very short period of time.

With reference to the time factor an important feature of the invention is the provision of a coordinated system of core production timing in relation to the making of the molds so that the cores are made at the same speed and with as much facility as are the molds, so that the cores can be made and positioned in the molds as fast the molds are ready.

A broad object of this invention is to make core making an integral part of the modern mold making operation.

Many additional detailed objects of this invention will be apparent from the following disclosure of preferred methods of proceeding and apparatus for carrying them out which comprise this invention.

In the accompanying drawings there is illustrated somewhat diagrammatically the apparatus and procedure comprising this invention:

FIGURE 1 is an exploded view of the apparatus for making a plurality of cores simultaneously and in the accurately arranged alignment required;

FIGURES 2, 3 and 4 are cross-sectional views taken on the line 2—2, 3—3 and 4—4 of FIG. 1;

FIGURE 5 is a diagrammatic view with some parts broken away showing the core box in position in a core blowing machine;

FIGURE 6 is a cross-sectional view showing the relationship of the core box to the core blower at the instant of core blowing;

FIGURE 7 is an enlarged detail view of a portion of the core blower plate of this invention;

FIGURE 8 is a diagrammatic side elevational view with some parts broken away of the core box in the machine for solidifying the cores, which as illustrated is of the freezer type;

FIGURE 9 is a perspective view of the bottom of the core box with the solidified cores in place;

FIGURE 10 is a perspective view of one of the solidified cores;

FIGURE 11 is a diagrammatic side elevational view indicating the step of applying the mold drag to the core box bottom of FIG. 9;

FIGURE 12 is a plan view of the mold drag showing the mold cavities;

FIGURE 13 is a side elevational view illustrating the step of removing the core box bottom from the mold drag in which the cores have been positioned;

FIGURE 14 is a plan view of the mold drag showing the cores in position;

FIGURE 15 is a partial detailed view showing the mold drag after the mold has been poured and the cope has been removed;

FIGURE 16 is a perspective view of a cast unit showing four castings with the core in place; and FIGURE 17 is a perspective view of one of the finished castings with the core removed.

In accordance with this invention a core stick plate 10 is prepared in any suitable manner and corresponds to a pattern plate such as might be used in preparing the molds, reference to which will be made latter. The core stick plate 10 consists of a flat plate of suitable material whose dimensions are approximately those of the pattern plate. This plate is provided with a bushing (not shown) containing a non-round hole 10$^c$ at one end and a bushing (not shown) containing a round hole 10$^d$ at the other end. The pattern plate is similarly equipped. The center distance and alignment of the non-round and round holes of the core stick plate and pattern plate are exactly the same.

As clearly shown in FIG. 3, the two halves CP of a core pattern are shown affixed to opposite sides of the plate 10. The core pattern parts may be attached to the faces of the plate in any suitable manner, as for example by means of machine screws S and dowels (not shown), and each half is perfectly matched with its mate. There are as many core patterns CP on the core stick plate 10 as there are patterns on the pattern plate. The positions of the core patterns CP on the core stick plate 10 and patterns on the pattern plate are exactly the same with respect to one another and with respect to the non-round and round holes. Several methods can be used to achieve accurate positioning and great care and precision should be exercised. There are a number of ways in which this core stick plate can be made but the preparation of the core pattern parts CP and their accurate positioning on the plate and attachment thereto as described above is commercially useful.

The cores are formed in a core box which comprises the bottom 12 and the top 14. As illustrated in FIG. 1, each part of the core box consists of a frame of any suitable material which can be likened to a picture frame open on both faces. The frame 12 is provided at one end with a bushing (not shown) having the round hole $12^d$ and a bushing (not shown) with the non-round hole $12^c$ at the other end. The holes have the same center distance and alignment as the holes $10^c$ and $10^d$ of plate 10 and the holes of the pattern plate.

Since the top 14 of the core box is generally of similar construction it will also be described to the same extent at this time. It includes a frame of suitable material open on both sides and provided at its ends with the round hole $14^d$ and the non-round hole $14^c$ as before. It is provided with indexing pins $14^e$ arranged to seat in the properly positioned holes $12^e$ in the core box bottom when assembled as shown in FIGS. 5 and 8. The core stick plate 10 is provided with holes to accommodate the pins $14^e$.

The two sections of the core box are prepared in the following manner: The drag half of a flask, equipped with non-round and round pins whose center distance and alignment are exactly the same as the non-round and round holes $10^c$ and $10^d$, $12^c$ and $12^d$, $14^c$ and $14^d$ in the plate 10 and frames 12 and 14 respectively, is used to align the non-round and round holes of plate 10 and frames 12 and 14 by 1st—Putting frame 12 on top of the flask with the pins of the flask protruding through holes $12^c$ and $12^d$.
2nd—Putting plate 10 on top of frame 12 with the pins of the flask protruding through holes $10^c$ and $10^d$.
3rd—Putting frame 14 on top of plate 10 with the pins of the flask protruding through holes $14^c$ and $14^d$.

The result is a sandwich like assembly with the drag of a flask and members 12, 10 and 14 superposed in a pile on contact.

A suitable filling material P is then filled into each frame, first one then the other, to a level with the exposed faces of the frames and allowed to set. There are many materials suitable for this purpose, particularly plastic materials which when cured will be solid and form sustaining. The important characteristic of the material P must be that it will not shrink or expand while setting or curing so that when it is finally solidified and ready for use the resulting cavities in the material P will retain the positioning and size determined by the core pattern parts CP on the core stick plate 10.

When the sandwich is opened up, as shown in FIG. 1, the result will be that there will be cavities in the bottom and top of the core box parts 12 and 14 which are exact reproductions of the core pattern parts CP and which have exact predetermined positions with respect to the non-round and round holes of members 10, 12, 14 and the pattern plate. Thus, as illustrated in FIG. 1, the bottom member 12 will have the cavities corresponding to the core pattern parts on the bottom of the plate 10, as shown at BCC. Similarly, the core box part 14 will have the cavities TCC. If it is desired to make the core box of a shrinkable or expandable material such as cast metal, it is necessary to follow a slightly different procedure in the making of the core box in order that the cavities of the core box and patterns correspond in position. The core box can be cast first and then the patterns located in exact relation to the cavities of the core box.

The core box bottom 12 has a series of grooves on the lower face, the ends of which show at $12^h$, which extend below the cavities BCC in a position so that the vent passages $12^g$ which extend through the solidified material P, connect the cavities BCC with the venting channels $12^h$. As illustrated in FIG. 1, the channels $12^h$ extend all the way across the plate at right angles to the axis which includes the lugs $12^a$ and $12^b$. One of these passages also appears in FIG. 6. The passages $12^g$ which connect with the passages $12^h$ can be cut into the solidified molding material P in any suitable manner. The top 14 of the core box is provided with a series of nozzle holes NH which pass through the solidified material P and open into the cavities TCC. With reference to the bottom box it will be seen that the apertures NH are at the opposite sides of the cavities with respect to the vent passages $12^g$.

When the core box top and bottom parts are reassembled with the core stick plate removed as illustrated in FIG. 5, the cavities BCC and TCC will be brought together to form the molds for the core sand. The proper alignment of the two parts of the core box is assured by means of three indexing pins $14^e$ on the top part 14 cooperating with three holes $12^e$ on the bottom part 12. The core box is then ready to be introduced into a conventional core blowing machine which has been placed in close proximity to the molding machine and which has been modified for the purposes of this invention by the provision of a special form of core blower plate 16. The plate itself is of any suitable material and is provided on its lower surface with a series of nozzles $16^a$ communicating with apertures through the plate, as clearly illustrated in FIG. 7. These nozzles are tapered, dimensioned and positioned to fit snugly into the nozzle holes NH in the top 14 of the core box.

Secured to the under surface of the plate 16 in proper and accurate relationship with regard to the nozzles are the guides $16^b$, $16^c$ and $16^d$. The core blower plate 16 is secured in any suitable manner, as for example by means of bolts, not shown, to the end face of a frame member F, which is part of the bottom end of a sand magazine SH. The sand magazine has an aperture suitably dimensioned as indicated at FA so that the aperture surrounds the area which includes the nozzles $16^a$, as is particularly clear from FIG. 6 in which sand is diagrammatically illustrated at S. To blow the cores the core box is placed on a table or surface TCB which may be part of the core blower machine.

The complete machine (which is shown somewhat exploded in FIG. 5) is normally at rest so that the core box can be slid in under the nozzles $16^a$ guided by the side guides $16^b$ and $16^d$. The back guide $16^c$ limits the movement of the box into position. Thus these guides accurately position the core box on the table TCB so that when the table is raised, the nozzles $16^a$ all accurately enter the nozzle openings NH and when the parts have been brought to the position shown in FIG. 6, the lower ends of the nozzles will project a short distance into the core cavities. The machine is now ready to blow the cores, which is done by any of the conventional core blowing or shooting principles. As is well known in this art, these cores can be blown in a second or two, which means that the core cavities will be completely filled with sand. Each of these cavities is vented through the exhaust vents 12ᵍ and the passages 12ʰ, and through exhaust vents in the core box top 14 if desired.

In accordance with this invention, in one embodiment the sand is mixed with sodium silicate so that the cores can be solidified in accordance with the so-called "freezing" method by the use of carbon dioxide. In order to use this method the core box with the blown cores is removed from the core blowing machine and introduced into a simple "freezing" machine adjacent to the core blower diagrammatically illustrated in FIG. 8, by means of which carbon dioxide can be fed into the cores. Or the "freezing" unit may be actually a part of the core blower. One practical arrangement would include a ram comprising a ram plate RP and a ramrod R. The ram plate is provided with a suitably dimensioned cavity GC on its end face of sufficient size and dimension to enclose the area of the top 14 of the core box carrying the nozzle apertures NH. When the ram is in raised position the core box can be slid in on top of the table TGU and under the ram plate RP into proper position against the guides G.

When the core box is thus properly positioned the ram descends automatically to clamp the core box on the table and form a seal between the top of the core box and the ram plate. A gasket, not shown, can be used in a well understood manner to aid in sealing. Carbon dioxide is then supplied automatically under pressure through the connection COF into the chamber GC and from there through the nozzle holes into the core box for reaction with the sodium silicate mixed in the sand. The vents 12ᵍ which assisted in the core blowing operation now assist in the "freezing" operation. The reaction is completed in a few seconds solidifying the cores C sufficiently for the molding operation, and a timer shuts off the gas supply and raises the ram plate RP.

The nozzles 16ᵃ serve a two-fold purpose:

First: If the core sand were blown directly into the aperture NH, these apertures would be filled with sand. When the core box is removed from the core blower, the holes would then have to be cleaned out because the solidifying agent, in this case carbon dioxide, would solidify this sand, and thereby plug the holes and prevent further use of the core box until the sand is removed.

Second: Without their use, a portion of the sand in the apertures NH would remain attached to the cores when the core box top 14 is removed. This would leave bumps or protrusions of sand on the cores which would interfere with the cores resting properly on the core prints of the mold cavities.

It will be understood that it would be within the principle of this invention to use other methods of filling the core box cavities and other solidifying agents in mixture with the sand and other kinds of reagents, even including heat, to effect solidification of the cores.

The top 14 of the core box is then removed, leaving the solidified cores C in the cavities in the bottom 12 of the core box, as illustrated in FIG. 9.

FIG. 10 is provided solely for the purpose of showing a complete core solidified and suitable for future processing, but it is to be understood that the cores are not removed from the core box bottom 12 for further processing in accordance with this invention.

The core box bottom 12 is placed upon a suitable platform TM, such as the roller conveyor which is normally next to the molding machine, as is shown in FIG. 11. The drag of the mold MD, turned upside down, is then placed on top of the core box bottom 12. The drag has previously been prepared in accordance with any known and suitable procedure, including modern molding machinery. The drag consists of a frame, as clearly shown in FIG. 12, within which is the mold consisting of a suitable sand mixture S in which by means of the pattern plate the mold cavities MC for the desired objects have been formed. In the case illustrated the articles to be molded are elbows such as is shown in FIG. 17. In the layout illustrated in FIG. 12, four such elbows are provided for in each cavity MC, except the two outside rows of cavities where provision is made for two elbows.

At this point it may be explained that for a standard size flask in accordance with this invention with the particular size elbows illustrated, it is possible to provide sufficient cavities to effect the casting of 60 elbows at one time. To simplify the drawings, as illustrated in FIG. 12, provision is made to cast 24 elbows. At this point it may be noted that no attempt has been made to show either for the drag or cope of the flask the required sprues, runners and gates, with the exception that in FIG. 12 several of the gates are shown at GA, which as is usual, interconnect the mold cavities.

The drag is provided with the non-round pin 20 and the round pin 22. When the drag is upside down, the pins point downward. These pins are relatively positioned and dimensioned so as to cooperate accurately with the non-round hole 12ᶜ in the core box bottom 12 and the round hole 12ᵈ. This insures that the drag MD can be placed down on the core box bottom 12, as indicated in FIG. 11 in accurate alignment by the nesting of the pins 20 and 22 with the apertures 12ᶜ and 12ᵈ. Since the pins are often longer than the thickness of the core box bottom, the platform TM should be narrower than the distance between holes 12ᶜ and 12ᵈ so that the face of the drag will engage the face of the core box. This places the upper half of the cores C in the cavities MC and in exact centered relationship as illustrated in FIG. 14.

The assembled sandwich is then turned or rolled over, preferably right on the conveyor. This places the core box bottom 12 on top and the drag MD on the bottom. The core box bottom is removed, as indicated by the arrows in FIG. 13. This results in what is shown in FIG. 14.

The flask cope, not shown, is then placed down upon the drag in the usual manner so that the upper half of the mold cavities are properly related to the lower half, which are of course in the drag as previously explained. This assembly of the cope and drag is facilitated as before by means of the pins 20 and 22, and of course corresponding apertures in the cope. The cope, of course is prepared in the usual manner to provide the upper half of the mold cavities. In cases where the cores are asymmetrical, instead of symmetrical as illustrated, it is important to realize that that part of the core made in core box bottom 12 becomes situated in the cope and that part made in the core box 14 in the drag.

The completed mold, already on the roller conveyor because the conveyor was used as the platform TM on which the core box bottom 12 was set, is now pushed or conveyed to the pouring station, conveyed to the shake out and dumped. FIG. 15, the drag with the cope removed, shows how the castings F, comprising the elbows previously mentioned, have been formed within the mold cavities and around the cores C. These units, one of which is illustrated in FIG. 16, are then separated from the sand and flasks in the usual manner and processed to remove any sand remaining on or in the castings. The result is a plurality of cast fittings F such as is shown in FIG. 17, which as previously mentioned could be of the number sixty for a standard flask and for fittings of this particular size.

At this point it is well to recognize that improvised core jigs for one or two cores per mold are old in the art but by this invention the operation of taking the cores and setting them into the jig has been completely eliminated. This results because, in accordance with this invention, the cores are made in what may be called a core setter or jig and are transferred directly therefrom to the molds in the manner previously described.

The result of this operation is that the manufacture of the cores and their use in the molding operation can go along in accordance with the manufacture of the molds and at the same rate of speed. This means that the cores do not have to be prepared in advance, stored and placed in the molds individually by hand when required. All of the advantages of making the cores right along with the making of the mold and the rapid positioning thereof in the molds, as herein disclosed, should now be apparent to those skilled in the art.

It should be noted that the core box need not necessarily be filled from the top surface, i.e., the apertures NH need not necessarily be on the top surface of the core box. Some core boxes, especially those containing larger cavities can be, if desired, filled on the side at the parting line with the described nozzle holes and nozzles. Or the cavities can be positioned so that they open directly to one of the side surfaces of the core box at the parting line. Nozzle holes NH and nozzles $16^a$ are then not necessary. The core blower plate in this case has simple holes communicating with the core cavities. The core box is filled at the parting line while chucks hold the left and right sections together. However, it must be remembered the core cavities are still in the same relative positions as the mold cavities and holes $12^c$ and $12^d$, $14^c$ and $14^d$ must still be located as previously described. When it is time to transfer the cores to the mold, the core box must be laid bottom down so that the top core box section may be removed and the mold section placed on the bottom core box section thus positioning the cores in the mold cavities.

As will be readily apparent to those skilled in the art, many variations in the details of construction and steps of procedure can be effected without departing from the novel subject matter herein disclosed. It is desired, therefore, that the scope of this invention not be limited to the specific methods of proceeding as herein described, but only as required by the appended claim.

What is claimed is:

In a method of making and assembling a mold, the steps of forming one or more cores from a curable sand and sodium silicate binder mixture in a core box comprising top and bottom sections each having matching cavities, curing said core or cores with carbon dioxide while supported by at least one of said core box sections to provide firm, form-sustaining cores, superposing a mold section containing the same number of mold cavity halves on one of said core box sections, inverting the said assembly of mold and core box sections, removing said core box section so that the cores remain precisely positioned in the mold cavities of said mold section and superposing the other mold section containing mold cavity halves complementary to said first mold cavity halves on said mold section to provide completed mold cavities containing said cores accurately positioned therein.

References Cited in the file of this patent

UNITED STATES PATENTS

| | | |
|---|---|---|
| 1,034,336 | Bannister | July 30, 1912 |
| 1,353,472 | Haase | Sept. 21, 1920 |
| 2,607,968 | Peterson | Aug. 26, 1952 |

OTHER REFERENCES

Foundry Trade Journal publication, Oct. 25, 1956, page 475 relied on.